United States Patent [19]
Moreno et al.

[11] Patent Number: 5,918,005
[45] Date of Patent: Jun. 29, 1999

[54] APPARATUS REGION-BASED DETECTION OF INTERFERENCE AMONG REORDERED MEMORY OPERATIONS IN A PROCESSOR

[75] Inventors: Jaime Humberto Moreno, Hartsdale; Mavan Moudgill, Ossining, both of N.Y.

[73] Assignee: International Business Machines Corporation, Armonk, N.Y.

[21] Appl. No.: 08/827,016

[22] Filed: Mar. 25, 1997

[51] Int. Cl.[6] .................................................. G06F 11/25
[52] U.S. Cl. ...................................................... 395/183.14
[58] Field of Search .......................... 395/183.14, 800.23, 395/709, 392

[56] References Cited

U.S. PATENT DOCUMENTS

| 5,420,990 | 5/1995 | Mckeen et al. ........................ 395/375 |
| 5,421,022 | 5/1995 | Mckeen et al. ........................ 395/800 |
| 5,542,075 | 7/1996 | Ebcioglu et al. ....................... 395/700 |
| 5,625,835 | 4/1997 | Ebcioglu et al. ....................... 395/800 |
| 5,689,712 | 11/1997 | Heisch ................................... 395/704 |

FOREIGN PATENT DOCUMENTS

| 0709770 | 9/1995 | European Pat. Off. . |
| 0742512 | 4/1996 | European Pat. Off. . |

*Primary Examiner*—Robert W. Beausoliel, Jr.
*Assistant Examiner*—Pierre E. Elisca
*Attorney, Agent, or Firm*—Jay P. Sbrollini

[57] ABSTRACT

The present invention is an apparatus that maps the memory address space of the computer system into regions, and detects the incorrect execution of a load operation performed earlier than a sequentially preceding (in program order) store operation. The apparatus detects out-of-order load operations, uses a region-based mapping table to keep track of the memory regions accessed by the out-of-order load operations, detects the execution of store operations into regions accessed by out-of-order load operations, and generates a program exception when interference among reordered operations is detected. The invention is applicable to static and dynamic reordering of memory operations.

27 Claims, 10 Drawing Sheets

Computer system supporting dynamic reordering of instructions

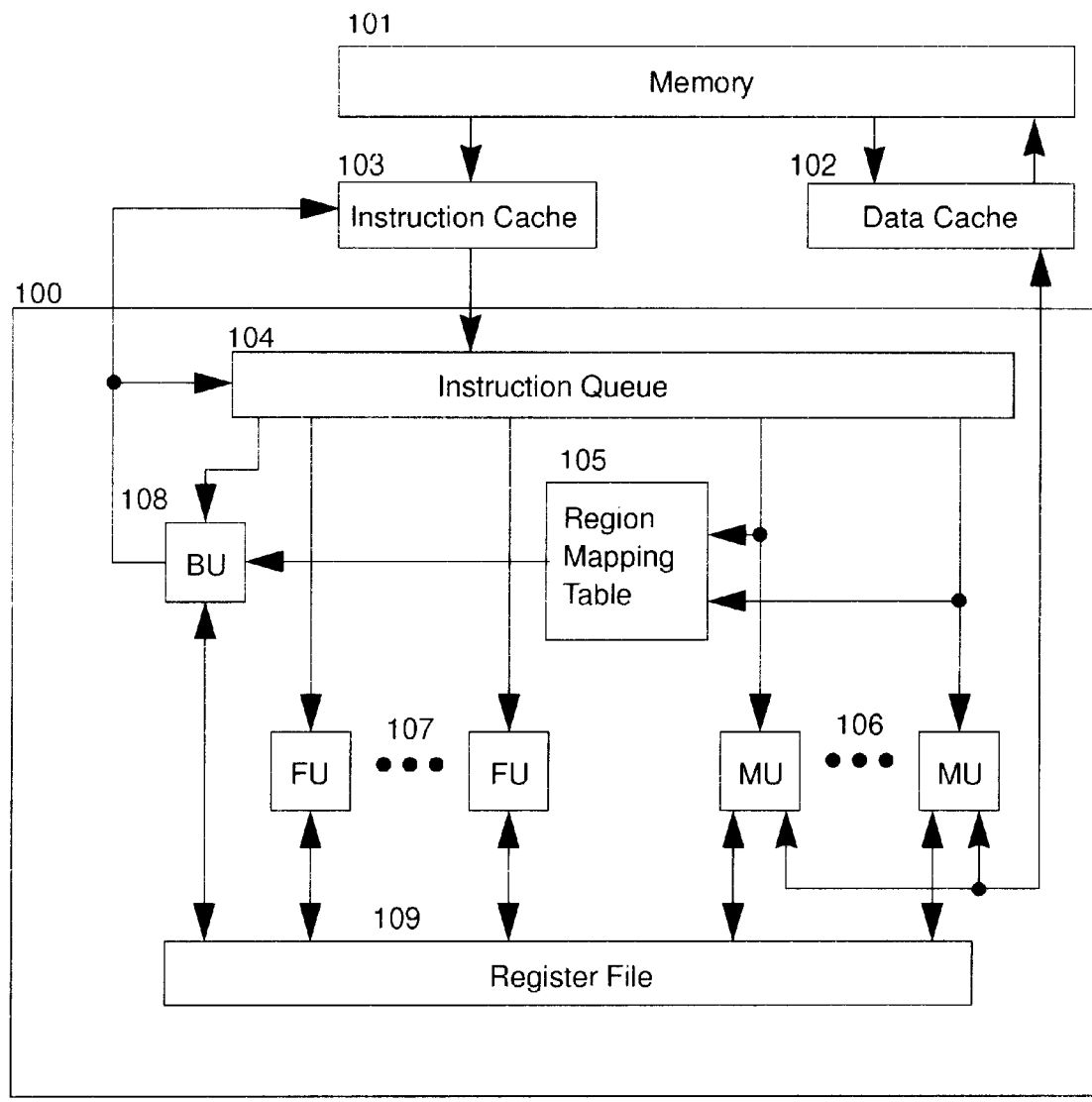
Figure 1 - Computer system supporting stating reordering of instructions

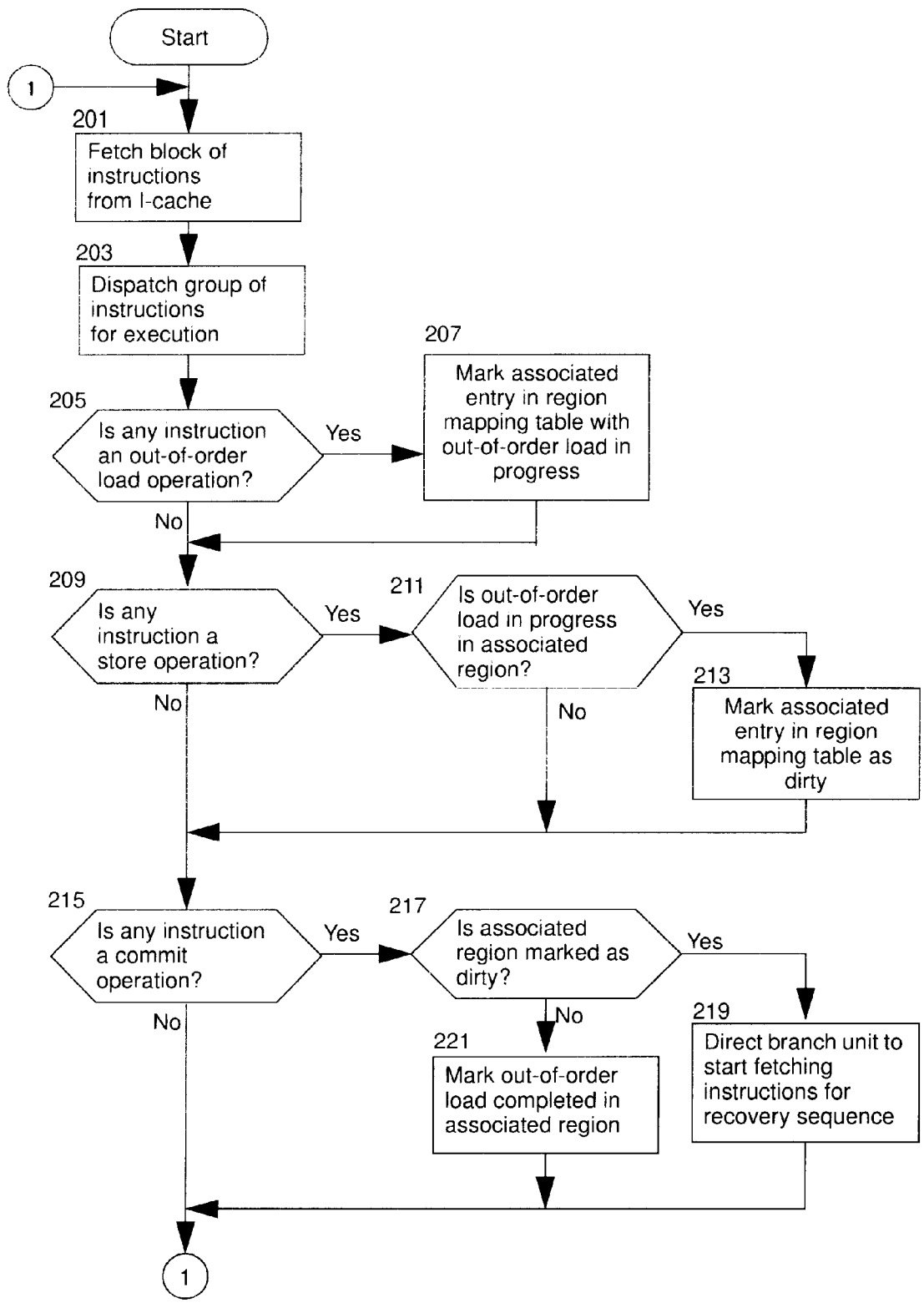
Figure 2 - Execution of statically-reordered instructions

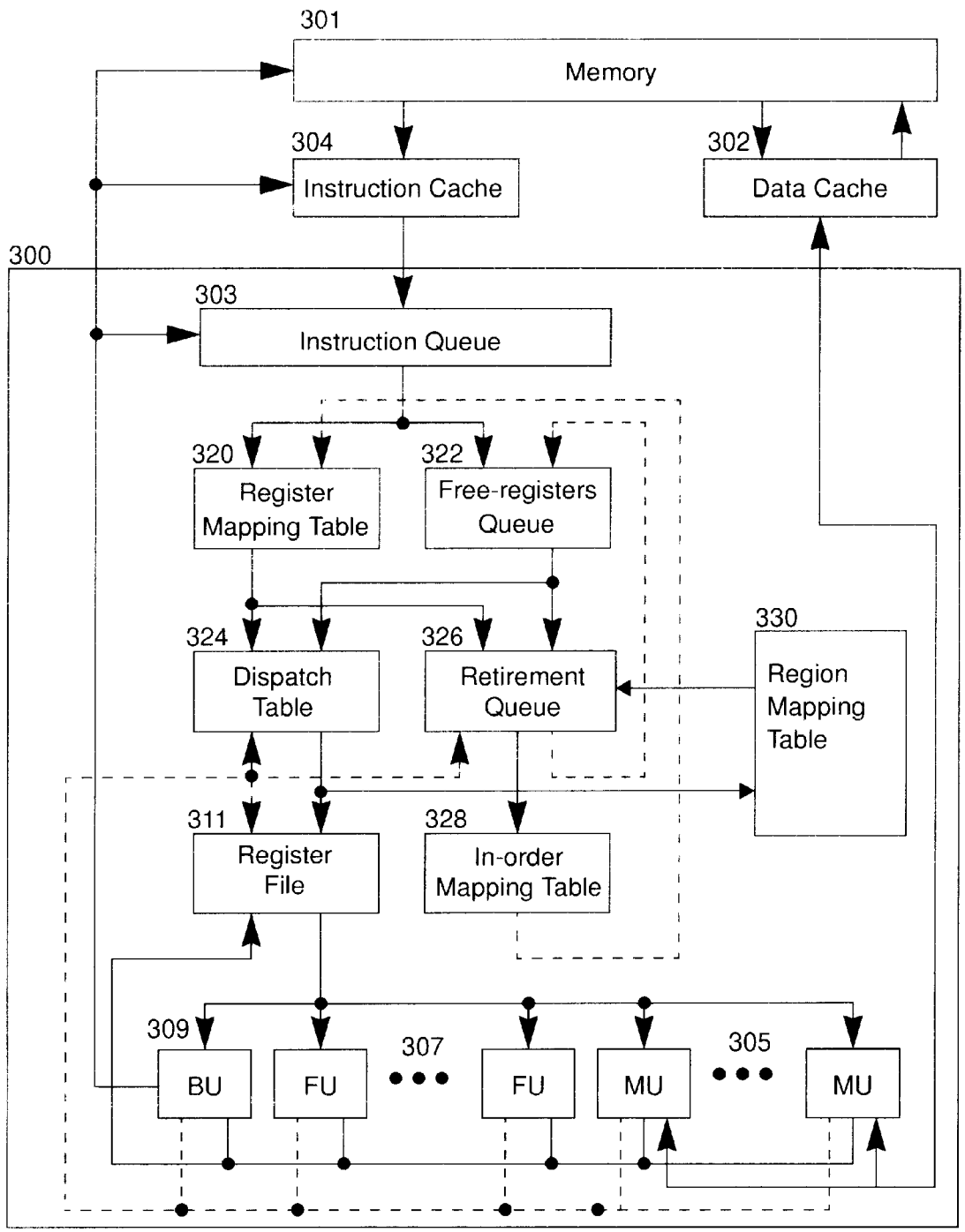
Figure 3 - Computer system supporting dynamic reordering of instructions

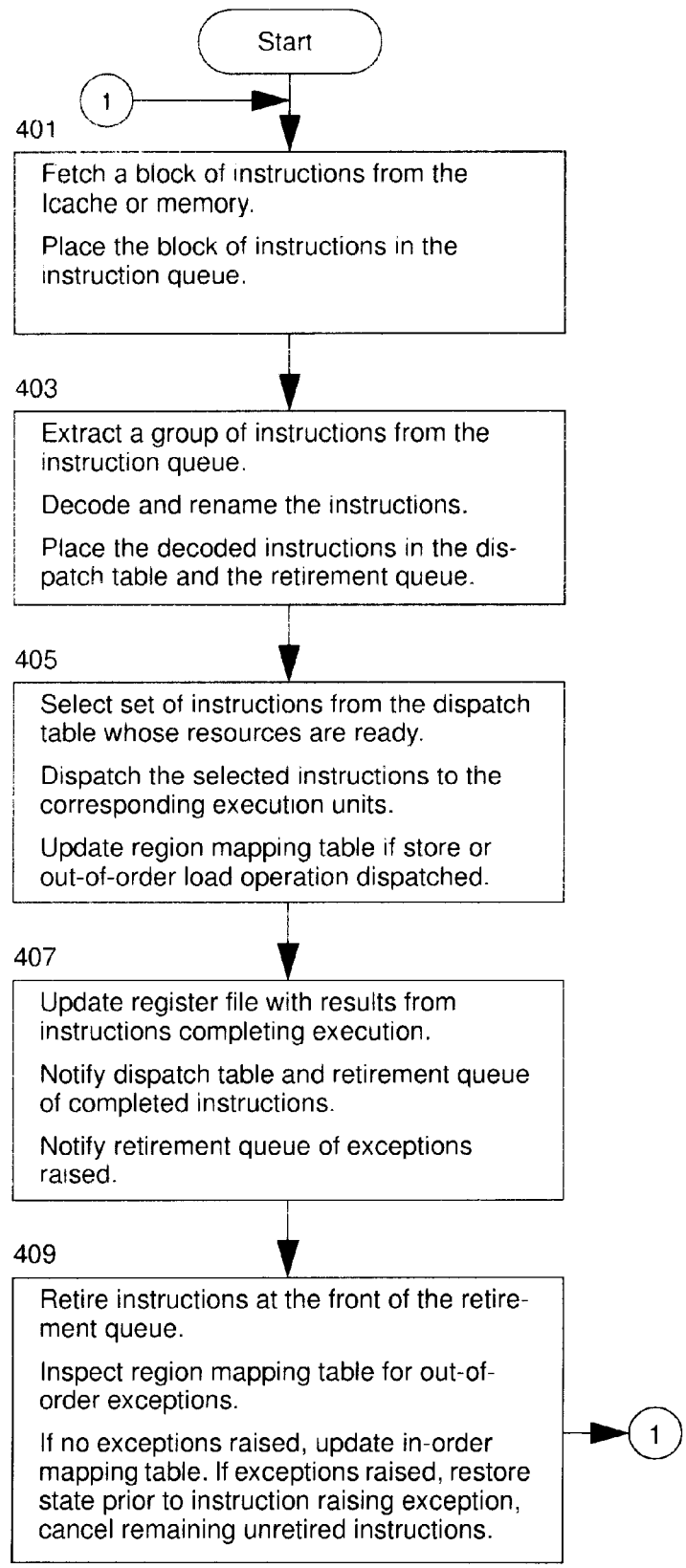
Figure 4 - Execution of dynamically reordered instructions

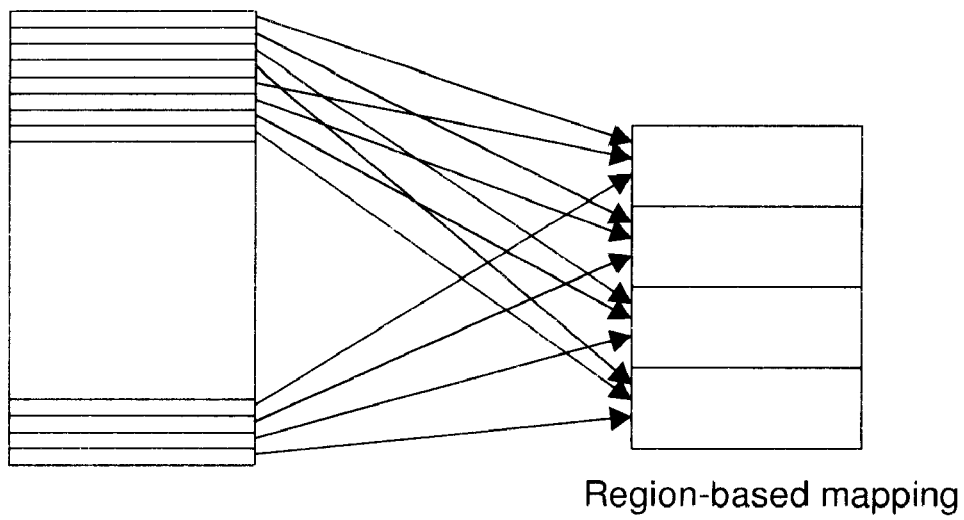
Figure 5a - Mapping of memory address space into regions
| | 520 | 510 |
|---|---|---|
| Region 0 | Counter | Status |
| Region 1 | | |
| Region k-1 | | |
Figure 5b - Contents of region mapping table in preferred embodiment

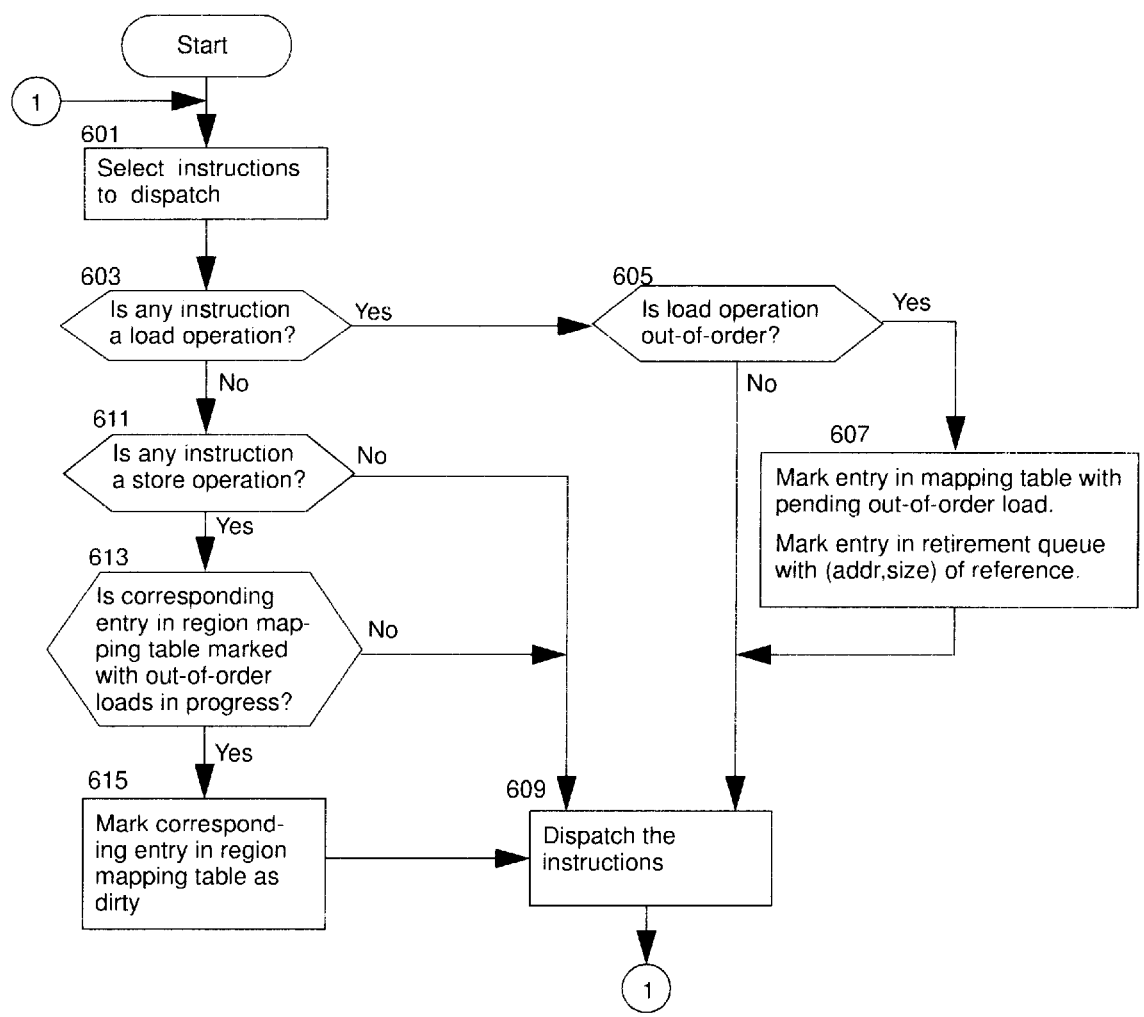
Figure 6 - Dispatching instructions in dynamic reordering processor

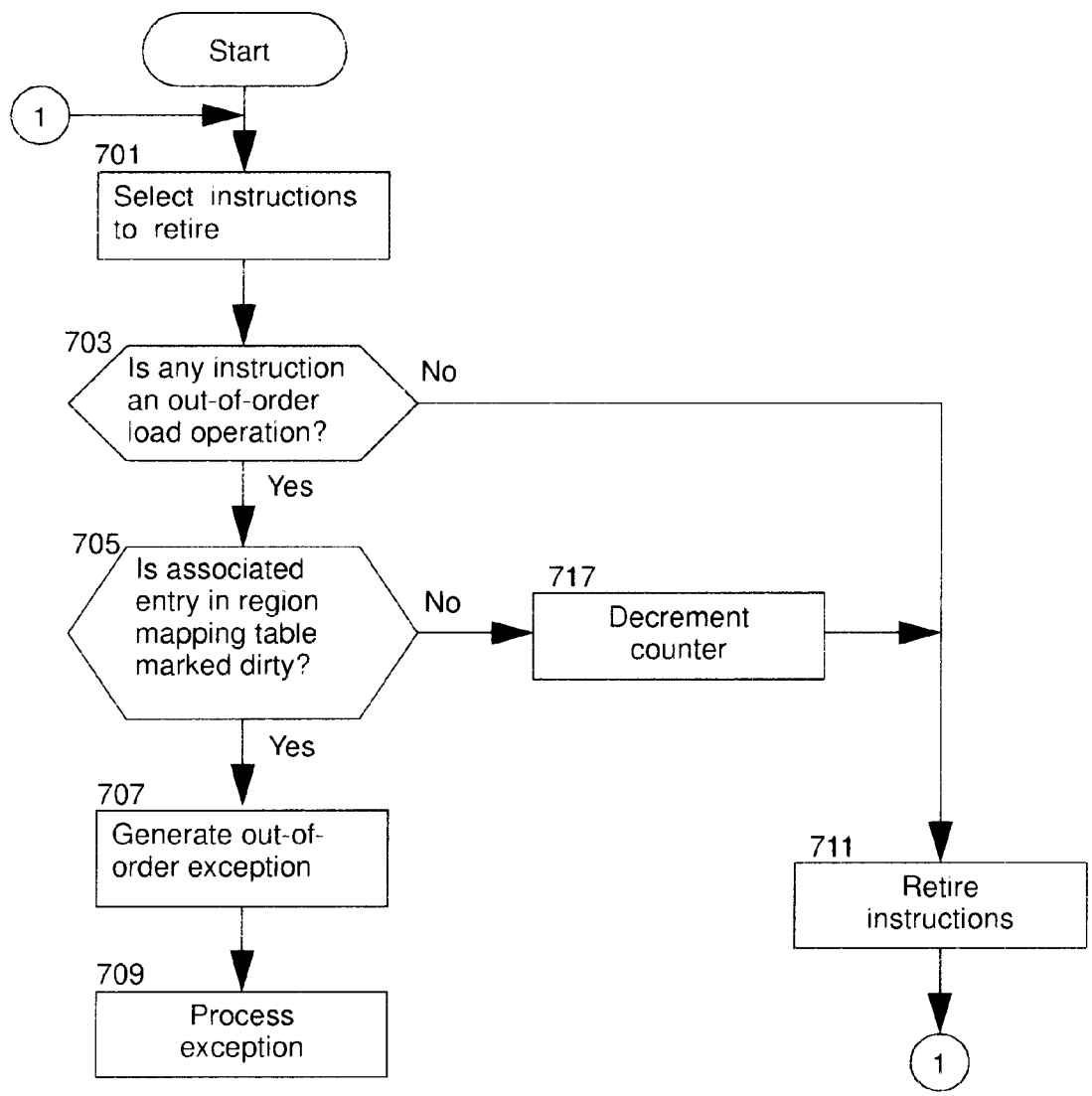
Figure 7 - Retiring instructions in dynamic reordering processor

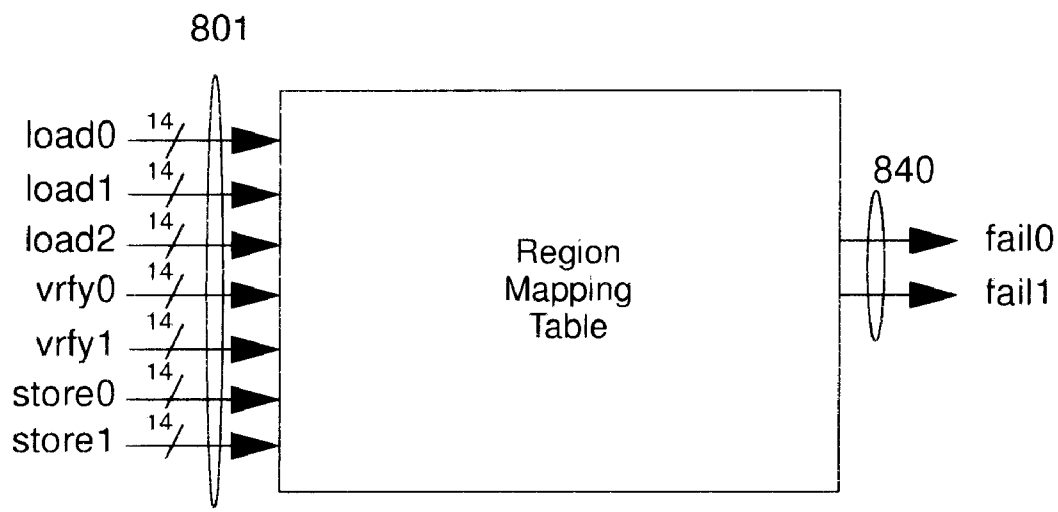
Figure 8a - Input/output signals to Region Mapping Table
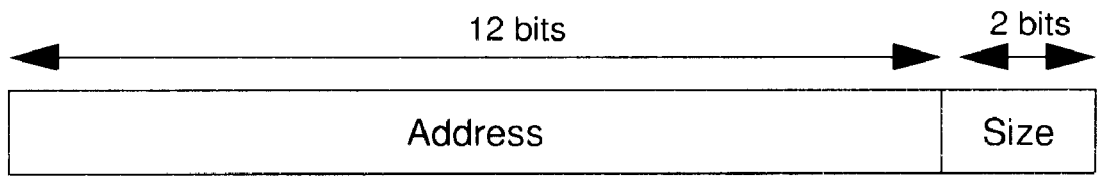
Figure 8b - Format of inputs to Region Mapping Table

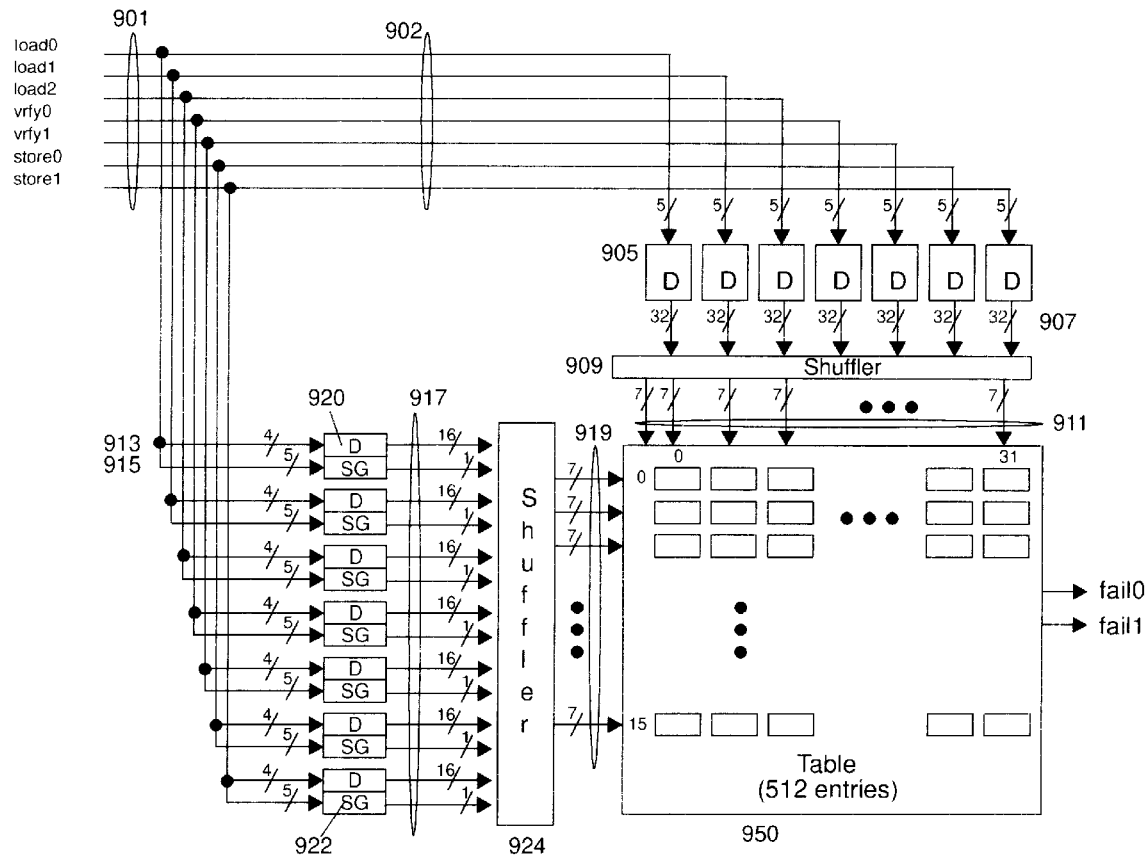
Figure 9 - Region-based Mapping Table
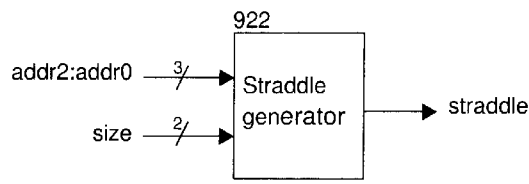
Figure 10 - Straddle generation unit

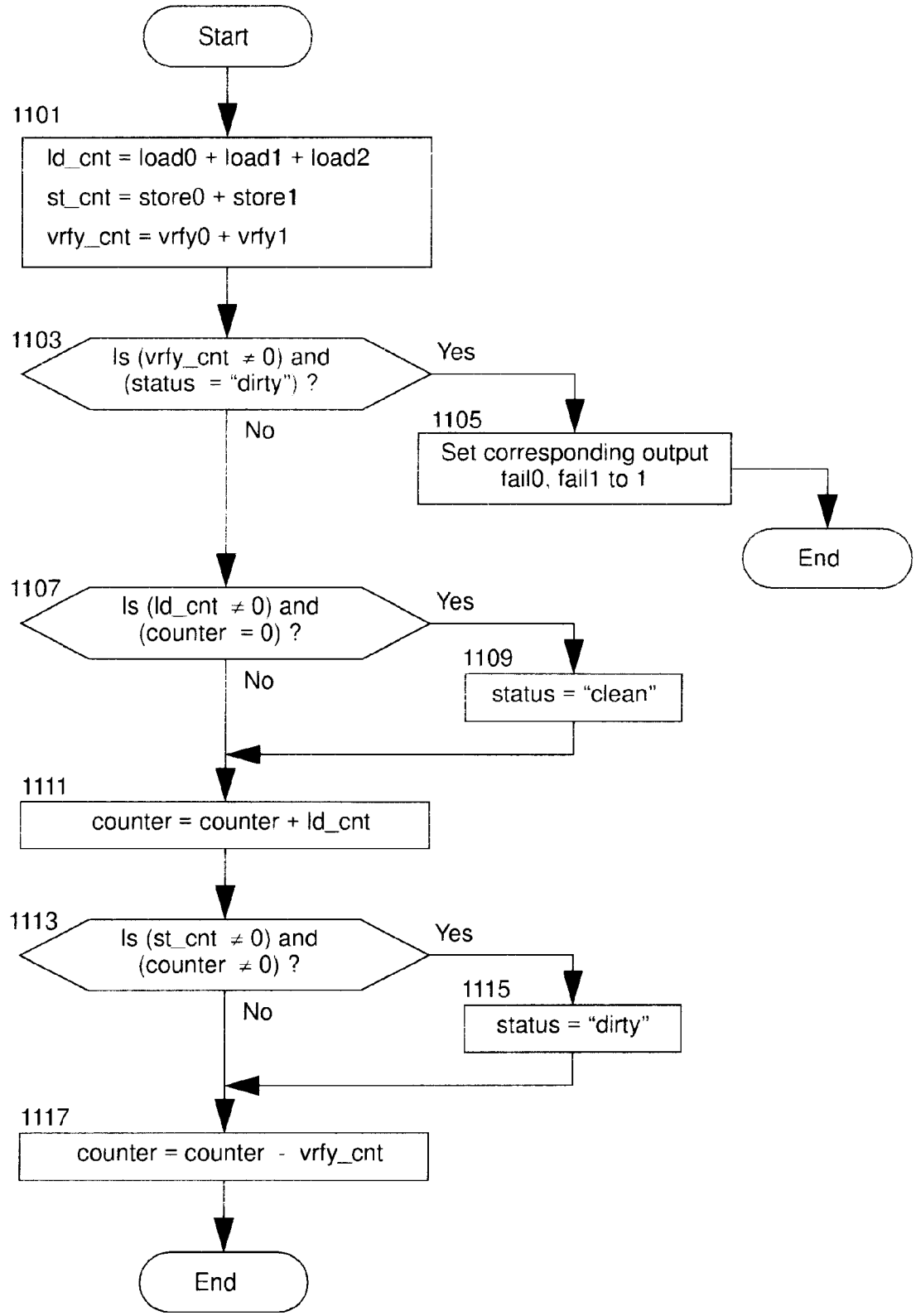
Figure 11 - Functionality of cell in two-dimensional table

APPARATUS REGION-BASED DETECTION OF INTERFERENCE AMONG REORDERED MEMORY OPERATIONS IN A PROCESSOR

BACKGROUND OF THE INVENTION

1. Field of the Invention

The present invention generally relates to reordering memory operations in a processor in order to exploit instruction-level parallelism in programs and, more particularly, to an apparatus for the detection of incorrect execution of a memory load operation performed earlier than preceding (in program order) memory store operations. The invention is applicable to operations reordered when the program is generated (static reordering) as well as to operations reordered at execution time (dynamic reordering).

2. Background Description

Contemporary high-performance processors rely on superscalar, superpipelining, and/or very long instruction word (VLIW) techniques for exploiting instruction-level parallelism in programs; that is, for executing more than one instruction at a time. In general, these processors contain multiple functional units, execute a sequential stream of instructions, are able to fetch from memory more than one instruction per cycle, and are able to dispatch for execution more than one instruction per cycle subject to dependencies and availability of resources.

The pool of instructions from which the processor selects those that are dispatched at a given point in time is enlarged by the use of out-of-order execution. Out-of-order execution is a technique by which the operations in a sequential stream of instructions are reordered so that operations appearing later are executed earlier if the resources required by the operation are free, thus reducing the overall execution time of a program. Out-of-order execution exploits the availability of the multiple functional units by using resources otherwise idle. Reordering the execution of operations requires reordering the results produced by those operations, so that the functional behavior of the program is the same as what would be obtained if the instructions were executed in the original sequential order.

In the case of memory-related operations, a memory load operation reads a datum from memory, loads it in a processor register, and frequently starts a sequence of operations that depend on the datum loaded. Thus, in addition to using idle resources, the early (out-of-order) initiation of memory load operations may hide delays in accessing memory, including potential cache misses.

There are two basic approaches towards implementing out-of-order execution and reordering of results: dynamic reordering and static reordering. In dynamic reordering, the instructions are analyzed at execution time, and the instructions and results are reordered in hardware. In static reordering, a compiler/programmer analyzes and reorders the instructions and the results produced by those instructions when the program is generated, thus the reordering tasks are done in software. These two approaches can also be used jointly.

One factor that limits the ability to reorder operations is ambiguous memory references; this is the case when a memory load operation appears after a memory store operation in a sequential instruction stream, and it is not possible to determine ahead of time whether the memory locations accessed by the load and the store are different. For example, consider the following code fragment:

$$*X=(a+b+2)<<4$$
$$r=((*Y)+c)\char`\^d$$

wherein:
  *X indicates the memory location whose address is contained in X;
  << indicates a left-shift operation; and
  ^ indicates an exclusive-or (XOR) operation.

Assuming that a, b, c, and d are values stored in registers r1 through r4 of a processor, and that X and Y are in registers r8 and r9, then this code fragment can be represented by the following instruction sequence (wherein the first register after the name of the instruction is the target register, and the remaining registers are the operands):

| | | |
|---|---|---|
| add | r10,r1,r2 | ; r10 = a+b |
| add | r11,r10,2 | ; r11 = a+b+2 |
| shift_left | r12,r11,4 | ; r12 = a+b+2<<4 |
| store | r12,(r8) | ; *X = a+b+2<<4 |
| load | r20,(r9) | ; r20 = *Y |
| add | r21,r20,r3 | ; r21 = *Y+c |
| xor | r22,r21,r4 | ; r22 = (*Y+c)^d |

If it can be determined that X and Y are different, then the two expressions can be scheduled for parallel execution, yielding a sequence like (wherein the symbol ‖ denotes parallel execution):

| | | | | |
|---|---|---|---|---|
| add | r10,r1,r2 | ‖ | load | r20,(r9) |
| add | r11,r10,2 | | | |
| shift_right | r12,r11,4 | ‖ | add | r21,r20,r3 |
| store | r12,(r8) | ‖ | xor | r22,r21,r4 |

In a machine with two execution units, the sequence above would take 4 cycles to complete (assuming that a load takes two cycles, and other operations take a single cycle).

On the other hand, if it cannot be determined that X and Y are always different, i.e. the addresses are ambiguous, then the two expressions should be scheduled in the original order, taking 8 cycles (assuming again that a load takes two cycles).

The example above is not atypical; ambiguity in memory references limits performance fairly severely by forcing the sequential execution of operations that could otherwise be executed in parallel. However, such a serialization can be avoided (that is, the load operation can be performed earlier than the store operation) as long as the store operation does not interfere with the load operation. The operations interfere whenever the memory locations accessed by the store operation and the out-of-order load operation overlap. Moreover, if the store operation and the out-of-order load operation do not interfere, any operation that depends on the datum loaded out-of-order can also be performed out-of-order. On the other hand, if the operations interfere, the datum loaded out-of-order and any results derived from it are invalid, making it necessary to re-execute the load operation after the store operation, as well as the associated dependent operations.

Various attempts have been made towards solving the problem of reordering memory operations with ambiguous references by processors. These schemes detect interference by comparing the address of the memory location accessed by an out-of-order load with the addresses of the memory locations accessed by succeeding store operations, within a window of execution determined by the extent of the reordering of the load operation. If the addresses overlap, then it is assumed that the operations interfere, so the load operation (and those operations that depend on the load which have already been executed, if applicable) must be re-executed. That is, the mechanisms monitor whether there has been any modifications to the memory location containing a datum loaded out-of-order by keeping track of memory addresses. The detection is performed either by extra instructions (software-based schemes), or by dedicated hardware resources (hardware-based schemes) sometimes with software assistance.

For example, in the case of software-based detection of interference, the code fragment given earlier could be modified as follows:

```
r = ((*Y)+c)^d
*X = (a+b+2)<<4
if (X == Y)        /* compare the addresses */
   r = ((*Y)+c)^d
endif
```

That is, the program statements could be reordered so that the load operation implied by *Y is performed earlier than the store operation implied by *X; additional statements are introduced for comparing the addresses of the memory locations referenced by the load and the store operations, and for re-executing the statement containing the load operation whenever the addresses match.

In the case of static reordering, the sequence of instructions generated by the compiler/programmer differs among the various schemes proposed for dealing with ambiguous memory references. Usually, a load instruction which has been moved above a store instruction is replaced by some new instruction or instruction sequence which performs the load operation and sets up a mechanism for monitoring the addresses used by store instructions; another instruction, or an instruction field in the out-of-order load instruction, is used to indicate the place where the load instruction was originally located, which determines the end of the range of monitoring for interfering store operations.

In the case of dynamic reordering, load and store instructions are presented to the processor in program order, that is, the store instruction followed by the load instruction. The processor reorders the instructions, marks the load instruction as an out-of-order operation, sets up a mechanism for detecting interference from store operations (which includes the identification of the range of monitoring), and recovers the correct state of the processor when interference is detected.

This invention follows the approach of hardware-based detection of interference among out-of-order load and store operations, with a mechanism for recovering from the case of incorrectly reordered memory operations. A summary of relevant related art in the field is now set forth.

A method and apparatus for improving the performance of out-of-order operations is described by M. Kumar, M. Ebcioglu, and E. Kronstadt in their patent application entitled "A method and apparatus for improving performance of out-of-sequence load operations in a computer system," Ser. No. 08/320,111 filed Oct. 7, 1994, as a continuation of application Ser. No. 07/880,102 filed May 6, 1992, and assigned to the assignee of this application. This method and apparatus uses compiler techniques, four new instructions, and an address-compare unit. The compiler statically moves memory load operations over memory store operations, marking them as out-of-order instructions. The addresses of operands loaded out-of-order are saved in an associative memory. On request, the address-compare unit compares the addresses saved in the associative memory with the address generated by store operations. If a conflict is detected, recovery code is executed to correct the problem. The system clears addresses saved in the associative memory when there is no longer a need to compare those addresses. This approach is hardware-intensive, and also requires special instructions to trigger the checking for conflicts in addresses as well as to clear the address of an operand no longer needed.

U.S. patent application Ser. No. 08/435,411, filed May 10, 1995, in the name of Ebcioglu et al., assigned to the assignee of the application, combines reordering of memory operations with speculative execution of memory operations. The reordering of the memory operations relies on:

static reordering of code by the compiler;

special hardware support to detect conflicts in memory references and manipulate data loaded out-of-order; and compiler-generated code for operating on the data loaded out-of-order and for recovering from the detection of conflicts.

The special hardware support consists of an address register for each register which can be the destination for the result of a load operation executed out-of-order, a comparator associated with each such address register, and special instructions to load a datum out-of-order and to "commit" such datum as well as any other values derived from it at in-order points in the program. Each out-of-order load records in the corresponding address register the memory address and size of the datum loaded; each store operation triggers the comparison of the (address, size) tuple against the contents of all address registers. If any such comparison is true, then the corresponding address register is marked as invalid. A special commit instruction is executed at the in-order point of the load instruction, which checks whether the associated address register is valid; if so, the datum loaded out-of-order and the datum in memory are coherent. On the other hand, if the address register is invalid, then the datum loaded out-of-order and the memory contents are not coherent, so that the load operation as well as any other operation must be re-executed. A trap is invoked at that time, transferring execution control to recovery code produced by the compiler which re-executes the load operation as well as the dependent operations.

U.S. Pat. No. 5,421,022 entitled "Apparatus and method for speculatively executing instructions in a computer system" issued on May 30, 1995 in the name of F. McKeen et al. describes an apparatus usable in the case of statically reordered ambiguous memory operations, which relies on content-addressable memories (CAM) to compare the address of every executed store operation with the address of every outstanding out-of-order load instruction. If an overlap is detected, the apparatus treats the out-of-order load as if it caused an exception, effectively causing the re-execution of the load operation at its in-order point, in its in-order (or precise) state. Similarly, U.S. Pat. No. 5,420,990 entitled "Mechanism for enforcing the correct order of instruction execution," also issued on May 30, 1995 in the name of F. McKeen et al., describes an apparatus closely related to the one proposed in U.S. Pat. No. 5,421,022 but usable in the case of memory operations reordered dynamically by the processor; this apparatus also relies on content-addressable memories.

A method and apparatus for reordering load instructions is described in the patent application entitled "Memory processor that permits aggressive execution of load instructions" by F. Amerson, R. Gupta, V. Kathal and M. Schlansker (UK Patent Application GB 2265481A, No. 9302148.3, filed on Apr. 2, 1993). This patent application describes a memory processor for a computer system in which a compiler moves long-latency load instructions earlier in the instruction sequence, to reduce the loss of efficiency resulting from the latency of the load. The memory processor saves load instructions in a special register file for a period of time sufficient to determine if any subsequent store instruction that would have been executed prior to the load references the same address as that specified by the load instruction. If so, the memory processor reinserts the original load in the instruction stream so that it gets executed in-order. Thus, this system permits moving loads ahead of stores under compiler control, and relies on hardware to insert code to recover from a conflict. However, this system does not permit reordering other instructions that depend on the load (the hardware resources are able to reinsert only the load instruction). In other words, the method and apparatus is limited to hiding the latency of load instructions, whose maximum value must be known at compile time.

The article by K. Diefendorff and M. Allen entitled "Organization of the Motorola 88110 superscalar RISC microprocessor," IEEE Micro, April 1992, pp. 40–63, describes the dynamic scheduler in the Motorola 88110 processor which dispatches store instructions to a store queue where the store operations might stall if the operand to be stored has not yet been produced by another operation. Subsequent load instructions can bypass the store operations and immediately access the memory, achieving dynamic reordering of memory accesses. An address comparator detects address hazards and prevents load operations from going ahead of store operations to the same address. The queue holds three outstanding store operations. The structure does not really move a load earlier in the sequential execution stream; instead, it only allows for a load operation not to be delayed as a result of a stalled store operation.

3. Problems with State of the Art

Software-based techniques to detect interference among reordered ambiguous memory operations suffer from large overhead, in the form of additional instructions that must be executed. Specifically, a load instruction needs to be checked against every ambiguous store instruction over which it is moved. For example, consider the case of moving a load instruction over several store instructions as in the following sequence:

| | |
|---|---|
| store | r7,(r21) |
| store | r8,(r22) |
| store | r9,(r23) |
| load | r15,(r25) |

In this case, the interference test requires comparing the address in register r25 with the addresses in registers r21, r22 and r23. Thus, the interference test requires at least five instructions, and may require many more (depending on the primitives for performing the comparisons and for combining several comparisons).

Moreover, if load and store instructions are byte-aligned (i.e. load and store instructions access data at any byte boundary in memory, and the data accessed is more than one byte), or if load and store instructions access entities of different size (different number of memory bytes), then the test is more complicated. Instead of checking just for equality in the addresses, the interference test must check for address overlap. Thus, assuming for example that rY contains the address used in an out-of-order load instruction and rX contains the address used in a succeeding store instruction, then the test will consist of checking that rY-rX is less than the number of bytes stored by the store instruction, and that rX-rY is greater or equal than the number of bytes accessed by the load instruction.

Hardware-assisted or hardware-only options for detecting interference among reordered ambiguous memory references avoid the overhead arising from executing extra instructions by saving the memory address used by out-of-order load instructions in special hardware resources (comparator registers), and continually checking the contents of those registers for overlap against the addresses of store instructions.

The resources required for hardware monitoring are complex and expensive. In every cycle, such resources must compare the address of each store operation issued in that cycle (assuming that one or more operations can be issued simultaneously) with all outstanding out-of-order load operations (i.e., those that have not yet reached their in-order point). This functionality can be achieved by using content-addressable memories, special register files, or multiple comparators, as illustrated by the examples of prior art given earlier. However, such hardware resources can only save (and compare against) a fixed number of out-of-order load addresses at any one point. Usually, this is a small number, so that only a limited (fixed) number of load operations can be executed out-of-order at any point in time. Such a fixed bound implies that an out-of-order load instruction cannot be issued as soon as a load unit becomes available to execute it; instead, the address checking hardware must also have resources available to save the address generated. This limitation adds complexity to the dispatch mechanism in the case of dynamic reordering, or restricts the number of ambiguous load instructions that can be moved out-of-order in the case of static reordering (i.e., the compiler must ensure that, at any given time, no more ambiguous load instructions have been moved over store instructions than the number of monitors available).

SUMMARY OF THE INVENTION

The problems stated above and the related problems of the prior art are solved with the principles of the present invention, an apparatus for the detection of and recovery from incorrect execution of reordered memory operations in a processor. The invention is a simpler alternative to other mechanisms because it does not require as expensive hardware resources to keep track of the addresses referenced by out-of-order load instructions. The invention is applicable to operations reordered when the program is generated (static reordering) as well as to operations reordered at execution time (dynamic reordering).

A computer processing system stores sequences of instructions in a memory for execution by a processor unit. An out-of-order load instruction may be created, either statically or dynamically, by moving a load instruction from its original position in a sequence of instructions to an earlier position in said sequence of instructions.

The present invention is a method and apparatus that maps the memory address space into a set of regions, and tests for interference among reordered memory operations at the granularity of a region. The addresses referenced by reordered memory operations are not directly compared; instead, those addresses are mapped into regions, and the apparatus detects whether there have been interfering references to those regions. This approach reduces the hardware cost imposed by the detection of interference, at the potential cost in some rare cases of detecting false interferences.

A region mapping table maps the memory address space into a set of regions. The number of memory locations per region is determined by the number of regions supported by the mapping table (the number of entries in the table) and the size of the minimum unit of interference. For example, a region mapping table may contain 512 entries, and the minimum unit of interference may be a memory word (four bytes); in such a case, a $2^{32}$ memory address space is mapped into 512 regions with $2^{21}$ memory locations (words) per region. Memory references are mapped either onto a single region, or onto more than one region whenever the reference straddles the alignment of the minimum unit of interference. The reordering of operations may be restricted so that out-of-order load operations do not straddle the alignment of the minimum unit of interference.

When an out-of-order load operation is executed, the entry in the region mapping table corresponding to the memory address of the out-of-order load operation is marked, thereby indicating the presence of the out-of-order load operation.

When a store operation is executed, if the entry in the region mapping table corresponding to the memory address of the store operation is marked with an out-of-order load operation, then the entry is marked again indicating the presence of an interfering store operation in the memory region.

When the in-order position of an out-of-order load operation is reached, the entry in the region mapping table corresponding to the memory address of the out-of-order load operation is inspected. If the entry has been marked indicating the presence of an interfering store operation, then the out-of-order load operation is regarded as incorrectly executed and a recovery sequence is invoked. Otherwise, the entry is updated to indicate the end of monitoring for interference with the out-of-order load whose in-order position has been reached.

An alternative method is as follows. When an out-of-order load operation is executed, the entry in the region mapping table corresponding to the memory address of the out-of-order load operation is marked, thereby indicating the presence of the out-of-order load operation. If there is no other out-of-order load from that region whose in-order position has not been reached, the entry is marked as having no interference from store operations. When a store operation is executed, the entry in the region mapping table corresponding to the memory address of the store operation is marked, whithout inspecting first whether an out-of-order load instruction from the region has been executed. When the in-order position of an out-of-order load operation is reached, the entry in the region mapping table corresponding to the memory address of the out-of-order load operation is inspected. If the entry has been marked indicating the presence of a store operation to the region, then the out-of-order load operation is regarded as incorrectly executed and a recovery sequence is invoked. Otherwise, the entry is updated to indicate the end of monitoring for interference with the out-of-order load whose in-order position has been reached. This alternative might lead to the detection of interference in cases where interference has not really occurred, but might lead to simpler embodiments.

The invention can be used for the case of statically reordered operations, that is, when reordering is performed by the compiler/programmer at the time the program is generated. In this case, an out-of-order load operation is specified by using a special instruction; the execution of this instruction includes marking the corresponding entry in the region mapping table. The compiler/programmer also generates a "commit" operation by using another special instruction, which is placed at the in-order (original) position of the load instruction; the execution of the commit instruction includes inspecting the corresponding entry in the region mapping table, and either invoking a recovery sequence or updating the entry in the table. These two instructions determine the range of monitoring for interferences from store operations. An entry in the region mapping table is marked indicating the presence of interfering store operation when a store operation is executed, either with or without checking if the associated entry is already marked by an out-of-order load operation. A program exception is generated whenever interference is detected, leading to the execution of a recovery sequence generated statically by the compiler/programmer.

The invention can also be used for the case of dynamically reordered instructions, that is, when reordering of instructions is performed at execution time. In such a case, the generation of out-of-order load operations is performed by the processor. An entry in the region mapping table is marked when a load operation is dispatched for execution out-of-order, thereby indicating the presence of an out-of-order load operation in progress. The same entry is inspected when the out-of-order load operation is retired, which occurs at the in-order position of the instruction. These two events determine the range of monitoring for interferences from store operations. An entry in the region mapping table is marked indicating the presence of an interfering store operation when a store operation is dispatched for execution, either with or without checking if the associated entry is already marked by an out-of-order load instruction. A program exception is generated whenever interference is detected. In such case, a recovery sequence is executed that returns the processor to the in-order state that existed prior to the execution of the load instruction being recuperated. In the recovery sequence all other instructions executed out-of-order are canceled, and execution proceeds starting from the load instruction in its original position.

BRIEF DESCRIPTION OF THE DRAWINGS

FIG. 1 is a block diagram of a computer system supporting static reordering of instructions, including memory operations, according to the present invention.

FIG. 2 is a flow diagram describing the execution of out-of-order memory operations in the computer system illustrated in FIG. 1.

FIG. 3 is a block diagram of a computer system supporting dynamic reordering of instructions, including memory operations, according to the present invention.

FIG. 4 is a flow diagram describing the processing of instructions in the computer system illustrated in FIG. 3.

FIGS. 5a and 5b is a pictorial illustration of the contents of the region mapping table.

FIG. 6 is a flow diagram describing the issuing of instructions in the computer system illustrated in FIG. 3.

FIG. 7 is a flow diagram describing the in-order retiring of instructions in the computer system illustrated in FIG. 3.

FIG. 8a illustrates input and output signals from a region mapping table which detects incorrectly reordered memory operations. FIG. 8b illustrates the contents of each of the input signals to the region mapping table.

FIG. 9 is a block diagram showing the major components of the region mapping table.

FIG. 10 is a block diagram illustrating input and output signals in the straddle generator unit used in the region mapping table of FIG. 8.

FIG. 11 is a block diagram showing the structure of each cell in the region mapping table of FIG. 9.

DETAILED DESCRIPTION OF THE INVENTION

Referring now to the drawings, and more particularly to FIG. 1, there is shown a processor provided with hardware resources to support statically reordered memory operations according to this invention. The system consists of a memory subsystem 101; a data cache 102; an instruction cache 103; and a processor unit 100. The processor unit 100 includes an instruction queue 104; a region-mapping table 105; one or more memory units 106 that perform memory related operations; one or more functional units 107 that perform integer, logic and floating-point operations; a branch unit 108; and a register file 109. Instructions are fetched from the instruction cache 103 under control of the branch unit 108 and are placed in the instruction queue 104. Instructions are dispatched from the instruction queue 104 to the memory units 106, functional units 107 and branch unit 108 for execution. These units interact with the register file 109 to access the operands used by the instructions and store the results produced by the execution of the instructions. The register file 109 typically includes general purpose registers (GPRs), floating-point registers (FPRs), condition registers (CRs), and special purpose registers (SPRs). The memory units 106 also interact with the data cache 102 to load the data used by the instructions executed in the other units, and to store the results produced by those instructions. Some special memory related instructions access the region mapping table 105.

According to the present invention, a programmer/compiler reorders memory operations to reduce the execution time of programs, following principles well known in the prior-art, as discussed for example in the article "Run-time disambiguation: coping with statically unpredictable dependencies" by A. Nicolau, IEEE Transactions on Computers, vol. 38, May 1989, herein incorporated by reference in its entirety. Whenever a load operation is moved earlier than a preceding store operation, and the compiler cannot determine whether the address of the memory locations accessed by the load and the store instructions are disjoint, the load instruction is marked as an out-of-order load operation preferably by using a distinct operation code. Moreover, the original place of the load instruction in the instruction sequence is marked preferably by using a special "commit" instruction.

The execution of instructions in the computer system depicted in FIG. 1 according to this invention is illustrated by the flow diagram depicted in FIG. 2. In step 201, a block of instructions is fetched from the instruction cache 103 and placed in the instruction queue 104, under control of the branch unit 108.

In step 203, a group of instructions executable concurrently is extracted from the instruction queue 104 and dispatched to the functional, memory and branch units for execution. Such a group corresponds to a sequence of instructions in strict memory order, that is, in the order in which they appear in memory. In step 205 is determined whether any of the instructions dispatched for execution to a memory unit 106 is an out-of-order memory load operation. This is determined by examining the operation code of the instructions. If so, in step 207 the entry in the region-mapping table associated with the address of the memory location accessed by an out-of-order load instruction is marked, thereby indicating the presence of an out-of-order load instruction. An example of the entries of the region mapping table is described later with respect to FIGS. 5a and 5b.

Similarly, in step 209 is determined whether any of the instructions dispatched for execution to a memory unit 106 is a memory store operation, by examining the operation code of the instructions. If so, in step 211 the entry in the region-mapping table associated with the address of the memory location accessed by the store instruction is inspected to determine whether an out-of-order load operation from the corresponding memory region has been dispatched or executed, thereby indicating the presence of an out-of-order load instruction. If so, then in step 213 the entry in the region mapping table is marked so that the region has an interfering store operation. More specifically, an interfering store operation is a sequentially preceding -in program order- store operation that accesses the same region of memory as the out-of-order load operation. Further description of the marking of an interfering store operation is given later, in conjunction with FIG. 9.

In step 215, is determined whether any of the instructions dispatched for execution to a memory unit 106 is a commit out-of-order load operation, by examining the operation code of the instructions. If so, in step 217 the entry in the region-mapping table associated with the address of the memory location referenced by the commit instruction is inspected to determine whether there is an interfering store operation in the corresponding memory region, thereby indicating interference among the operations. If so, then in step 219 a recovery sequence that returns the processor to the in-order state that existed prior to the execution of the load instruction is invoked. Such a recovery sequence may be invoked by the branch unit 108 fetching instructions from a memory location containing a recovery sequence. Otherwise, the entry in the table is updated to reflect the completion of the out-of-order load instruction. Further description of the detection of an interfering store operation is given later, in conjunction with FIG. 9.

Referring now to FIG. 3, there is shown a superscalar processor provided with hardware resources to support dynamic reordering of instructions, including reordering memory operations. This exemplary organization is based on the one described by M. Moudgill, K. Pingali, S. Vassiliadis in "Register renaming and dynamic speculation: an alternative approach," in Proceedings of the 26th Annual International Symposium on Microarchitecture, pp. 202–213, December 1993, herein incorporated by reference in its entirety. The system consists of a memory subsystem 301; a data cache 302; an instruction cache 304; and a processor unit 300. The processor unit 300 includes

- an instruction queue 303 containing instructions fetched from the instruction cache 304 and/or memory subsystem 301 which have not yet been decoded;
- several memory units 305 that perform load and/or store operations;
- several functional units 307 that perform integer, logic and/or floating-point operations;
- a branch unit 309 that perform branch operations;
- a register file 311 containing operands used and results produced by the instructions;
- a register mapping table 320 containing the mapping from the register names specified in the instructions to the names of registers in the register file;
- a free-registers queue 322 containing the names of unused (available) registers in the register file;

a dispatch table 324 containing decoded instructions, including their renamed registers, which are waiting for the resources required for their execution;

an in-order mapping table 328 containing the mapping from the architected register names to the names of registers in the register file, reflecting the effects of the last instruction which has been retired (executed to completion);

a retirement queue 326 containing instructions already dispatched for execution, and instructions already executed whose results have not yet modified the in-order state of the processor, and a region mapping table 330 for supporting the out-of-order execution of memory operations.

FIG. 4 illustrates a flow diagram describing the processing of instructions in the computer system illustrated in FIG. 3, including the actions related to out-of-order memory operations. The process is decomposed into five steps. In step 401, a block of instructions is fetched from the instruction cache 304 or memory subsystem 301, and is placed in the instruction queue 303 under control of the branch unit 309.

In step 403, a group of instructions is extracted from the instruction queue 303 and decoded. The register names used by these instructions for specifying the operands are renamed according to the contents of the register mapping table 320, which specifies the current mapping from architected register names to physical registers. Similarly, the register names used by these instructions for specifying the destinations for the results are assigned physical registers extracted from the free-register queue 322, which contains the names of physical registers not currently being used by the processor. The principles of register renaming are well known, as discussed for example in the book "Computer architecture: a quantitative approach, 2nd. ed.," by J. Hennessy and D. Patterson, Morgan Kaufmann Publishers, Inc., 1996. The register mapping table 320 is updated with the assignments of physical registers to the destination register names specified by the instructions. The decoded instructions, with all their registers renamed, are placed in the dispatch table 324; in addition, the instructions, including their memory addresses, their physical and their architected register names, are placed in the retirement queue 326, in program order.

In step 405, a set of instructions from the dispatch table is selected for execution, potentially out-of-order, and dispatched to the corresponding memory units 305, functional units 307, or branch unit 309. The candidate instructions for selection must have all the required resources available (the physical registers have been assigned the expected operands, and the corresponding functional units are free). The operands used by the instructions are read from the register file 311, which typically includes general-purpose registers (GPRs), floating-point registers (FPRs), and Condition Registers (CRs). If any of the instructions selected for execution is an out-of-order load operation, the entry in the region mapping table 330 corresponding to the out-of-order load instruction is marked to reflect the presence of such an operation among the instructions being dispatched. If any of the selected instructions is a store operation, and the entry in the region mapping table 330 corresponding to the store operation is marked indicating that there is an out-of-order load operation from that region in progress, then the entry is marked to indicate that the region has an interfering store operation (a sequentially preceding -in program order- store operation accessing the same region as the out-of-order load operation). An example of the entries of the region mapping table is described below with respect to FIGS. 5a and 5b. Further description of the marking of an interfering store operation is given later, in conjunction with FIG. 6.

In step 407, the results from instructions completing execution are placed in the register file 311. The retirement queue 326, and the instructions in the dispatch table 324 waiting for the physical registers set by the instructions completing execution, are notified. The retirement queue 326 is also notified if any of the instructions completing execution raised an exception.

Finally, in step 409, completed instructions are removed from the retirement queue 326, in program order (from the head of the queue). If no exceptions were raised by the instructions being retired, the in-order mapping table 328 is updated so that the architected register names used by the instructions point to the physical registers in the register file 311 containing the results from the instructions being retired; the previous register names from the in-order mapping table 328 are returned to the free-registers queue 322. More specifically, if an instruction being retired specifies architected register Rx as its target and the result of the operation has been placed in physical register Py, then the contents of the entry for Rx in the in-order mapping table is set to Py. On the other hand, if one or more of the instructions being retired has raised an exception, program control is set to the memory address of the first of such instructions (the address has been saved with the corresponding instruction in the retirement queue 326); the retirement queue 326 is cleared (flushed), thus canceling all remaining un-retired instructions; the register mapping table 320 is set to the contents of the in-order mapping table 328; and any physical register not specified in the in-order mapping table 328 is added to the free-registers queue 322.

Also in step 409, if any of the instructions being retired is an out-of-order load operation, the region mapping table 330 is inspected to verify whether there has been an interfering store operation in the region corresponding to the out-of-order load instruction. If so, a recovery sequence that returns the processor to its in-order state that existed prior to the execution of the load instruction is invoked. Such a recovery sequence may be invoked by raising an exception as described above. Otherwise, the entry in the table is updating to indicate the completion of the out-of-order load operation. Further description of the detection of an interfering store operation is given later, in conjunction with FIG. 9.

FIG. 5a is a description of the mapping of the memory address space into regions. The mapping is performed at the granularity of a certain unit of interference. For example, consider a granularity of a memory doubleword. In this case, memory doublewords are assigned to regions in increasing order; that is, doubleword 0 is assigned to region 0, doubleword 1 to region 1, and so on, up to doubleword k−1 which is assigned to region k−1. The assignment wraps around to the beginning of the region mapping table, so that doubleword k is assigned to region 0, doubleword k+1 to region 1, and so on. That is, the least-significant $\log_2 k$ bits from the doubleword address of a memory location determine its region; all bytes within a memory doubleword are mapped onto the same region. Alternatively, other granularity and/or other mapping functions may be used. In the example above, memory operations referencing up to two doublewords are allowed; consequently, memory references are mapped either onto a single region or onto two regions. An alternative embodiment of the invention may restrict reordering of operations so that out-of-order load operations are mapped onto a single region.

FIG. 5b is an example of the contents of the mapping table of the present invention. Each entry in the mapping table preferably consists of a status field 510 and a counter field 520.

The counter field 520 indicates how many out-of-order load operations which reference locations within the corresponding region have been dispatched for execution and have not yet reached their original position in the instruction sequences (they have not yet been committed).

The status field indicates whether interference has been detected among reordered memory operations which have referenced memory locations within the corresponding region. The possible values for the status field 310 are "clean" and "dirty." A status field set to "clean" indicates that no interference among reordered memory operations within the region has been detected, that is, there has not been any store operation to the corresponding region since dispatching an out-of-order load operation which is still in progress; on the other hand, a status field set to "dirty" indicates that there has been an interfering store operation to the region.

FIG. 6 is a flow diagram describing in more detail the actions performed by the processor unit 300 when dispatching instructions for execution, that is, when selected instructions are sent to the corresponding functional units. This figure includes the actions regarding the modification of the region mapping table 330 and the detection of interfering store operations. In step 601, the instructions to be dispatched for execution are selected from the dispatch table 324. In step 603, it is determined whether any of the selected instructions is a load operation. If not, in step 611 it is determined whether any of the selected instructions is a store operation. If not, the process continues in step 609 wherein the instructions are dispatched for execution; that is, the instructions are sent to the corresponding functional units 305, 307 or 309, are removed from the dispatch table 324, and are added to a retirement queue 326.

If in step 611 it is determined that there is one or more store operations among the selected instructions, then in step 613 the counter field 520 of the entry(ies) of the region mapping table 330 that correspond to the selected store operations are inspected. In the preferred embodiment of the present invention, each store operation is mapped onto one or two memory regions; the least-significant $\log_2 k$ bits from the doubleword address of the memory location accessed by the store operation and the size of the operand determine the corresponding regions, as described later in conjunction with FIG. 9. Two adjacent regions are selected from this mapping whenever the starting address of the memory reference plus the size of the operand accessed straddle a memory doubleword boundary (the unit of mapping). For each store operation, if the value of its corresponding counter field(s) 520 is zero, indicating that there are no out-of-order load operations in progress associated to the region(s), no action is performed; on the other hand, if the value of the corresponding counter field(s) 520 is not zero, then in step 615 the status field 510 is set to "dirty."

If in step 603 it is determined that there is one or more load operations among the selected instructions, then in step 605 it is determined whether any selected load operation is an out-of-order load operation (i.e., there is a sequentially preceding store operation which has not yet completed execution and thus resides in the retirement queue 326). This function is supported by two counters of store operations, whose counting capability is larger than the number of entries in the retirement queue. The first counter is incremented whenever a store operation is dispatched for execution; the second counter is incremented whenever a store operation completes execution. At the time that a load operation is dispatched for execution, if the value of the two counters does not match, then the load operation is being dispatched out-of-order (earlier than the completion of a preceding store operation). If the value of the two counters match, then the load instruction is being dispatched in-order, and the process continues in step 611. Alternatively, the ordering of load operations with respect to store operations may be determined on a region basis by augmenting the mapping table with store counters for each region, and comparing the store counters of the region corresponding to the load operation.

If in step 605 it is determined that a load operation is being dispatched out-of-order, then in step 607 the entry in the retirement queue containing the load operation is marked as out-of-order, and the least-significant $\log_2 k$ bits from the word address and the size of the operand accessed are placed in the entry in the retirement queue. In addition, in step 607 it is verified whether the counter field 520 of the entry in the mapping table 330 is set to zero. A value zero indicates that there are no other out-of-order load operations in progress. If so, in step 607 the status field 510 of the corresponding entry is set to "clean," and the counter field 520 is incremented (set to 1); then process continues in step 609. However, if the value of the counter field 520 is not zero, then the status field 510 is not modified, the counter field 520 is incremented, and the process continues in step 609.

FIG. 7 is a flow diagram describing in more detail the actions performed by the processor unit 300 when retiring instructions, including the actions regarding the mapping table 330. In step 701, the instructions to be retired are selected from the retirement queue 326. In step 703, it is determined whether any of the selected instructions was marked as an out-of-order load operation in step 607. If so, in step 705 it is determined whether the status field 510 of the corresponding entry in the mapping table 330 is "clean." As in previous cases, the corresponding entry is determined by accessing the mapping table, this time using the (address, size) information placed with the out-of-order load instruction in the retirement queue in step 607. If the entry is clean, then in step 717 the corresponding counter field 520 is decremented, and the process continues in step 711 wherein the instruction is retired normally from the retirement queue 326 together with the other instructions.

If in step 705 it is determined that the status field 510 of the corresponding entry in the region mapping table 330 is "dirty," an out-of-order exception is generated in step 707, and the exception is processed in step 709; thus, the effects of all un-retired instructions are canceled by removing all entries from the retirement queue 326, and then execution resumes at the in-order position of the load instruction in the program by setting the program counter register to the memory address of the load instruction being retired which is contained in the retirement queue.

FIGS. 8 and 9 illustrate an exemplary embodiment of the mapping table, for the case of a computer system whose virtual memory address space is $2^{32}$ bytes. The address space is partitioned into 512 regions. Memory locations are assigned to regions in increasing order, at the granularity of a doubleword; that is, doubleword 0 is assigned to region 0, doubleword 1 to region 1, and so on, up to doubleword 511 which is assigned to region 511. The assignment wraps around to the beginning of the mapping table, so that doubleword 512 is assigned to region 0, doubleword 513 to region 1, and so on.

FIG. 8a shows the input signals 801 and output signals 840 to/from the region mapping table, for the case of a processor system having three memory units dedicated to load operations, two memory units dedicated to store operations, and a retirement (commitment) unit capable of retiring (committing) two instructions simultaneously. The mapping table receives seven inputs, each of them consisting of 14 bits. Inputs load0 through load2 are received from the three memory units dedicated to load operations. Inputs store0 and store1 are received from the memory units dedicated to store operations. Inputs vrfy0 and vrfy1 are received from the retirement (commitment) unit.

The format of each input to the region mapping table is depicted in FIG. 8b. The 14 bits composing these inputs correspond to the least-significant 12 bits of the memory reference, and two bits indicating the size of the operand being accessed: byte, word, doubleword, or quadword.

FIG. 9 illustrates the major components of the mapping table. Preferably, the table is organized as a two-dimensional (16 by 32) array of cells, wherein each cell corresponds to an entry in the table. Entries are arranged column-wise; that is, adjacent regions in memory are allocated to cells in the same column, and the region associated with the last cell in a column is adjacent to the region associated with the topmost cell of the next column. Thus, the region associated with the last cell in the last column is adjacent to the region associated with the first cell in the first column.

A cell in the table is selected based on the coincident decoding of vertical and horizontal selection signals generated from the inputs to the table. That is, a selected cell is found at the intersection of a vertical signal set to 1 with an horizontal signal set to 1. Since there are seven simultaneous inputs to the table, up to seven cells can be selected at once; alternatively, fewer cells can be selected at once, and some cells may be simultaneously selected by different sources (load units, store units or verification units).

The seven input signals 901, with 14 bits each, are separated into three sets of seven signals with five, four and five bits, respectively. Each 5-bits signal 902 corresponds to the five most-significant bits from the address field in FIG. 8b, and is used to select a column of the two-dimensional table. Each four-bit signal 913 corresponds to the next four bits from the address field in FIG. 8b, and is used to select a row of the two-dimensional table. Each 5-bits signal 915 corresponds to the rightmost three bits from the address field and the two bits from the size field in FIG. 8b, and is used to detect whether the corresponding reference is contained within a single region or whether it straddles two regions.

Each 5-bits signal 902 is input to a binary decoder 905, which generates a 32-bit signal 907 in a 1-out-of-32 code. The seven 32-bits signals 907 are shuffled in the perfect shuffler 909, generating 32 signals 911 of 7-bits each which correspond to a decoded representation of all the 5-bits signals 902. Each one of these signals selects one column of the two-dimensional array. In addition, the rightmost 7-bits signal is input to the first cell in the two-dimensional array for detecting the case of straddles from the last cell to the first cell.

Each 4-bit signal 913 is input to a binary decoder 920, which generates a 16-bits signal in a 1-out-of-16 code. Each 5-bit signal 915 is input to a straddle generator 922, which generates a single bit signal indicating whether the memory reference (the tuple <address, size>) is associated with two adjacent entries in the region mapping table.

The seven 16-bit outputs from the binary decoders 920 and the seven 1-bit outputs from the straddle generators 922 are combined in the shuffler/mixer 924, generating 16 signals 919 of 7-bits each. These signals selects either one or two rows of the two-dimensional array, depending on whether the corresponding references access one or two regions.

The coincident decoding of signals 911 and 919 determines the selection of cells from the two-dimensional array 950 of 512 cells, which constitute the entries accessed in the region mapping table.

FIG. 10 is a block diagram illustrating input and output signals in the straddle generator units 922 used in the region mapping table of FIG. 9. This unit receives as inputs the three least-significant bits of the address field and the two bits from the size field in FIG. 8b. The first three bits correspond to the byte offset within the aligned doubleword assigned to a particular table cell. This offset is added with the size field. If the result from this addition is larger than 8 (the number of bytes in a doubleword, the size of the minimum unit of interference), then the reference straddles a region. In such a case, the output from the straddle generation unit is set to 1, otherwise it is set to 0.

FIG. 11 is a flow diagram showing the functionality of each cell in the region mapping table. The cell consists of a counter and a status field. In step 1101, the number of references of each type to the region is determined. The types of references include:

1) dispatch of an out-of-order load operation;
2) dispatch of a store operation; and
3) retiring (committing) of an out-of-order load operation.

In step 1103, if one or more out-of-order load instructions are being retired, the status field is inspected; if the value of this field is "dirty," then there has been interference among reordered memory operations within the region, so the process continues in step 1105 wherein the corresponding outputs fail0 and/or fail1 are set to 1, and the process terminates.

On the other hand, if the outcome from step 1103 is false, then in step 1107 is determined whether one or more out-of-order load instructions referencing the region are being dispatched and whether the value of the counter is 0, in which case in step 1109 the status field is set to "clean." The process continues in step 1111, wherein the counter is incremented by the number of out-of-order load operations being dispatched. The process then continues in step 1113.

In step 1113 is determined whether one or more store instructions that reference the region are being retired (committed) and whether the value of the counter is different from 0, in which case in step 1115 the status field is set to "dirty." The process then continues in step 1117.

In step 1117, the counter field is decremented by the number of out-of-order load instructions which are being retired (committed), and the process terminates.

While the invention has been described above with respect to particular embodiments thereof, those skilled in the art will recognize that the invention can be practiced with modification within the spirit and scope of the appended claims.

What is claimed is:

1. In a computer processing system wherein sequences of instructions are executed by a processor unit, wherein at least one of said instructions is a load instruction that is moved from an original position in said sequences of instructions to an earlier position in said sequences of instructions, and wherein said at least one load instruction is moved over at least one store instruction thereby becoming an out-of-order load instruction, wherein said out-of-order load instruction identifies a location in a memory subsystem from which to read data and said at least one store instruction identifies a location in the memory subsystem where to store data, a method for detecting interference between said out-of-order load instruction and said at least one store instruction, and for recovering from such interference, the method comprising the steps of:

storing in a table a plurality of entries, wherein each entry E corresponds to at least one region R of a plurality of regions of said memory subsystem, wherein each region of said memory subsystem encompasses a plurality of locations that may be accessed by out-of-order load instructions and store instructions wherein said entry E includes at least one field that indicates:

(i) whether said processor unit is processing at least one out-of-order load instruction that loads data from a location within said region R, and ii) whether said processor unit is processing at least one interfering store instruction that stores data to a location within said region R, wherein said interfering store instruction interferes with an out-of-order load instruction that loads data from a location within said region R;

identifying an entry E1 corresponding to a first out-of-order load instruction being processed by said processing unit, wherein said entry E1 corresponds to a region R1 of said memory subsystem and said first out-of-order load instruction loads data from a location within said region R1;

upon reaching said original position of said first out-of-order load instruction, controlling said processor unit to execute a recovery sequence if said at least one field of an entry E1 indicates that said processor unit is processing at least one interfering store instruction that stores data to a location within said region R1.

2. The method of claim 1, wherein said at least one field of said entry E indicates:

i) whether said processor unit has dispatched at least one out-of-order load instruction that loads data from a location within said region R, and ii) whether said processor unit has dispatched at least one interfering store instruction that stores data to a location within said region R; and wherein said controlling step controls said processor unit to execute a recovery sequence if said at least one field of said entry E1 indicates that said processor unit has dispatched said at least one interfering store instruction.

3. The method of claim 1, wherein said at least one field of said entry E indicates:

i) whether said processor unit has executed at least one out-of-order load instruction that loads data from a location within said region R, and ii) whether said processor unit has executed at least one interfering store instruction that stores data to a location within said region R; and wherein said controlling step controls said processor unit to execute a recovery sequence if said at least one field of said entry E1 indicates that said processor unit has executed said at least one interfering store instruction.

4. The method of claim 1, further comprising the steps of:

selecting at least one out-of-order load instruction for execution by said processor unit, wherein said out-of-order load instruction identifies a location LL in said memory subsystem from which to read data, and wherein said location LL is within a region LR of said memory subsystem;

for each out-of-order load instruction selected,
identifying an entry LE of said table corresponding to said region LR, and
updating said at least one field of said entry LE to indicate that at least one out-of-order load instruction that loads data from a location within said region LR is being processed by said processor unit.

5. The method of claim 1, further comprising the steps of:

selecting at least one store instruction for execution by said processor unit, wherein said at least one store instruction identifies a location SL in said memory subsystem in which to store data, wherein said location SL is within a region SR of said memory subsystem; and for each store instruction selected,
identifying an entry SE of said table corresponding to said region SR,
evaluating said at least one field of said entry SE, and
if said at least one field of said entry SE indicates that at least one out-of-order load instruction that loads data from a location within said region SR is being processed by said processor unit, updating said at least one field of said entry SE to indicate that at least one interfering store instruction that stores data to a location within said region SR is being processed by said processor unit.

6. The method of claim 1, further comprising the steps of:

selecting at least one out-of-order load instruction for commitment, wherein said at least one out-of-order load instruction identifies a location CLL in said memory subsystem from which data was read, and wherein said location CLL is within a region CLR of said memory subsystem; and for each out-of-order load instruction selected,
identifying an entry CLE of said table corresponding to said region CLR,
evaluating said at least one field of said entry CLE, and
executing said recovery sequence if said at least one field of said entry CLE indicates that at least one interfering store instruction that stores data to a location within said region CSR is being processed by said processor unit.

7. The method of claim 1, further comprising the step of:

if said at least one field of said entry CLE indicates that at least one interfering store instruction that stores data to a location within said region CSR is not being processed by said processor unit, updating said entry CLE to indicate that the selected out-of-order load instruction has completed.

8. The method of claim 1, wherein said at least one out-of-order load instruction and said recovery sequence is generated prior to the execution of the program, wherein said out-of-order load instruction is identified by a predetermined code in said out-of-order load instruction, wherein original position of said out-of-order load instruction is identified by a predetermined instruction generated prior to execution of the program, wherein said out-of-order load instruction is identified in response to decoding said predetermined code, wherein said original position of said out-of-order load instruction is identified in response to decoding said predetermined instruction, and wherein said control logic transfers execution control to said recovery sequence through one of a branch instruction and a program trap.

9. The method of claim 1, wherein said at least one out-of-order load instruction is generated during the execution of said program and is marked by a predetermined field attached to said instruction, and wherein said controlling step generates a program exception that:

a) cancels effects of said out-of-order load instruction,
b) cancels effects of other instructions executed out-of-order after said out-of-order load instruction, and
c) resumes execution from said original position of said out-of-order load instruction.

10. The method of claim 9,
wherein instructions are reordered during program execution and are executed out-of-order,
wherein completed instructions are placed in a retirement queue, removed from said retirement queue in program order, and retired in program order,
wherein original position of out-of-order load instruction is identified by position of said out-of-order load instruction in said retirement queue, and
wherein said program exception flushes said retirement queue to thereby cancel all remaining unretired instructions and resumes execution from said original position of said out-of-order load instruction.

11. In a computer processing system wherein sequences of instructions are executed by a processor unit, wherein at least one of said instructions is a load instruction that is moved from an original position in said sequences of instructions to an earlier position in said sequences of instructions, and wherein said at least one load instruction is moved over at least one store instruction thereby becoming an out-of-order load instruction, wherein said out-of-order load instruction identifies a location in a memory subsystem from which to read data, an apparatus for detecting interference between said out-of-order load instruction and said at least one store instruction, and for recovering from such interference, the apparatus comprising:
  a table comprising a plurality of entries, wherein each entry E corresponds to at least one region R of a plurality of regions of said memory subsystem, wherein each region of said memory subsystem encompasses a plurality of locations that may be accessed by out-of-order load instructions and store instructions, wherein said entry E includes at least one field that indicates:
    (i) whether said processor unit is processing at least one out-of-order load instruction that loads data from a location within said region R, and
    ii) whether said processor unit is processing at least one interfering store instruction that stores data to a location within said region R, wherein said interfering store instruction interferes with an out-of-order load instruction that loads data from a location within said region R;
  detection logic for identifying an entry E1 corresponding to a first out-of-order load instruction being processed by said processing unit, wherein said entry E1 corresponds to a region R1 of said memory subsystem and said first out-of-order load instruction loads data from a location within said region R1, and for detecting when said processor unit reaches original position of said first out-of-order load instruction; and
  control logic, coupled to said detection logic, for controlling said processor unit to execute a recovery sequence when said processor unit reaches original position of said first out-of-order load instruction and said at least one field of an entry E1 indicates that said processor unit is processing at least one interfering store instruction that stores data to a location within said region R1.

12. The apparatus of claim 11, wherein said at least one field of said entry E indicates:
  i) whether said processor unit has dispatched at least one out-of-order load instruction that loads data from a location within said region R, and
  ii) whether said processor unit has dispatched at least one interfering store instruction that stores data to a location within said region R; and
  wherein said control logic controls said processor unit to execute a recovery sequence when said processor unit reaches original position of said first out-of-order load instruction and said at least one field of said entry E1 indicates that said processor unit has dispatched said at least one interfering store instruction.

13. The apparatus of claim 11, wherein said at least one field of said entry E indicates:
  i) whether said processor unit has executed at least one out-of-order load instruction that loads data from a location within said region R, and
  ii) whether said processor unit has executed at least one interfering store instruction that stores data to a location within said region R; and
  wherein said control logic controls said processor unit to execute a recovery sequence when said processor unit reaches original position of said first out-of-order load instruction and said at least one field of said entry E1 indicates that said processor unit has executed said at least one interfering store instruction.

14. The apparatus of claim 11, further comprising:
  dispatch logic for selecting at least one out-of-order load instruction for execution by said processor unit, wherein said out-of-order load instruction identifies a location LL in said memory subsystem from which to read data, and wherein said location LL is within a region LR of said memory subsystem; and
  wherein said control logic, for each out-of-order load instruction selected by said dispatch logic,
    identifies an entry LE of said table corresponding to said region LR, and
    updates said at least one field of said entry LE to indicate that at least one out-of-order load instruction that loads data from a location within said region LR is being processed by said processor unit.

15. The apparatus of claim 11, further comprising:
  dispatch logic for selecting at least one store instruction for execution by said processor unit, wherein said at least one store instruction identifies a location SL in said memory subsystem in which to store data, wherein said location SL is within a region SR of said memory subsystem; and
  wherein said control logic, for each store instruction selected by said dispatch logic,
    identifies an entry SE of said table corresponding to said region SR,
    evaluates said at least one field of said entry SE, and
    if said at least one field of said entry SE indicates that at least one out-of-order load instruction that loads data from a location within said region SR is being processed by said processor unit, updates said at least one field of said entry SE to indicate that at least one interfering store instruction that stores data to a location within said region SR is being processed by said processor unit.

16. The apparatus of claim 11, further comprising:
  commit logic for selecting at least one out-of-order load instruction for commitment, wherein said at least one out-of-order load instruction identifies a location CLL in said memory subsystem from which data was read, and wherein said location CLL is within a region CLR of said memory subsystem; and wherein said control logic, for each out-of-order load instruction selected by said commit logic,
identifies an entry CLE of said table corresponding to said region CLR,
evaluates said at least one field of said entry CLE, and
executes said recovery sequence if said at least one field of said entry CLE indicates that at least one interfering store instruction that stores data to a location within said region CSR is being processed by said processor unit.

17. The apparatus of claim 11, wherein if said at least one field of said entry CLE indicates that at least one interfering store instruction that stores data to a location within said region CSR is not being processed by said processor unit, said control logic updates said entry CLE to indicate that the selected out-of-order load instruction has completed.

18. The apparatus of claim 11,
wherein said at least one out-of-order load instruction and said recovery sequence is generated prior to the execution of the program,
wherein said out-of-order load instruction is identified by a predetermined code in said out-of-order load instruction,
wherein original position of said out-of-order load instruction is identified by a predetermined instruction generated prior to execution of said program;
wherein said detection logic identifies said out-of-order load instruction in response to decoding said predetermined code,
wherein said detection logic identifies said original position of said out-of-order load instruction in response to decoding said predetermined instruction, and
wherein said control logic transfers execution control to said recovery sequence through one of a branch instruction and a program trap.

19. The apparatus of claim 11,
wherein instructions are reordered during program execution and are executed out-of-order,
wherein completed instructions are placed in a retirement queue, removed from said retirement queue in program order, and retired in program order,
wherein said at least one out-of-order load instruction is generated during the execution of said program and identified by a predetermined field attached to said instruction,
wherein original position of out-of-order load instruction is identified by position of said out-of-order load instruction in said retirement queue, and
wherein said control logic transfer execution control to said recovery sequence by generating a program exception that flushes said retirement queue to thereby cancel all remaining unretired instructions and resumes execution from said original position of said out-of-order load instruction.

20. The apparatus of claim 11, wherein said processor concurrently executes a plurality of instructions in a pipelined manner, wherein said execution process consists of a plurality of stages, wherein one stage can concurrently dispatch at least one out-of-order load instruction OOL1 and at least one store instruction S1, and wherein another stage can concurrently retire at least one out-of-order load instruction OOL2 and at least one store instruction S2;
wherein said table further comprises:
means for concurrently identifying first and second locations in said memory subsystem, wherein said first location is read by said at least one load instruction OOL1 and second location is stored to by said at least one store instruction S1;
means for concurrently identifying third and fourth locations in said memory subsystem, wherein said third location is read by said at least one load instruction OOL2 and second location is stored to by said at least one store instruction S2;
means for updating entries of said table in response to identification of said first, second, third and fourth locations to thereby identify presence of interfering store operations.

21. In a computer processing system wherein sequences of instructions are executed by a processor unit, wherein at least one of said instructions is a load instruction that is moved from an original position in said sequences of instructions to an earlier position in said sequences of instructions, and wherein said at least one load instruction is moved over at least one store instruction thereby becoming an out-of-order load instruction, wherein said out-of-order load instruction identifies a location in a memory subsystem from which to read data and said at least one store instruction identifies a location in the memory subsystem where to store data, a method for detecting interference between said out- of-order load instruction and said at least one store instruction, and for recovering from such interference, the method comprising the steps of:
storing in a table a plurality of entries, wherein each entry E corresponds to at least one region R of a plurality of regions of said memory subsystem, wherein each region of said memory subsystem encompasses a plurality of locations that may be accessed by out-of-order load instructions, and store instructions, wherein said entry E includes at least one field that indicates:
(i) whether said processor unit is processing at least one out-of-order load instruction that loads data from a location within said region R, and
ii) whether said processor unit is processing at least one store instruction that stores data to a location within said region R;
identifying an entry E1 corresponding to a first out-of-order load instruction being processed by said processing unit, wherein said entry E1 corresponds to a region R1 of said memory subsystem and said first out-of-order load instruction loads data from a location within said region R1;
upon reaching said original position of said first out-of-order load instruction, controlling said processor unit to execute a recovery sequence if said at least one field of an entry E1 indicates that said processor unit is processing at least one store instruction that stores data to a location within said region R1.

22. The method of claim 21, wherein said at least one field of said entry E indicates:
i) whether said processor unit has dispatched at least one out-of-order load instruction that loads data from a location within said region R, and
ii) whether said processor unit has dispatched at least one store instruction that stores data to a location within said region R; and
wherein said controlling step controls said processor unit to execute a recovery sequence if said at least one field of said entry E1 indicates that said processor unit has dispatched said at least one store instruction.

23. The method of claim 21, wherein said at least one field of said entry E indicates:

i) whether said processor unit has executed at least one out-of-order load instruction that loads data from a location within said region R, and ii) whether said processor unit has executed at least one store instruction that stores data to a location within said region R; and wherein said controlling step controls said processor unit to execute a recovery sequence if said at least one field of said entry E1 indicates that said processor unit has executed said at least one store instruction.

24. The method of claim 21, further comprising the steps of:

selecting at least one out-of-order load instruction for execution by said processor unit, wherein said out-of-order load instruction identifies a location LL in said memory subsystem from which to read data, and wherein said location LL is within a region LR of said memory subsystem;

for each out-of-order load instruction selected,
identifying an entry LE of said table corresponding to said region LR, and updating said at least one field of said entry LE to indicate that at least one out-of-order load instruction that loads data from a location within said region LR is being processed by said processor unit.

25. The method of claim 21, further comprising the steps of:

selecting at least one store instruction for execution by said processor unit, wherein said at least one store instruction identifies a location SL in said memory subsystem in which to store data, wherein said location SL is within a region SR of said memory subsystem; and for each store instruction selected,
identifying an entry SE of said table corresponding to said region SR,
update said at least one field of said entry SE to indicate that at least one store instruction that stores data to a location within said region SR is being processed by said processor unit.

26. The method of claim 21, wherein said at least one out-of-order load instruction and said recovery sequence is generated prior to the execution of the program, wherein said out-of-order load instruction is identified by a predetermined code in said out-of-order load instruction, wherein original position of said out-of-order load instruction is identified by a predetermined instruction generated prior to execution of the program, wherein said out-of-order load instruction is identified in response to decoding said predetermined code, wherein said original position of said out-of-order load instruction is identified in response to decoding said predetermined instruction, and wherein said control logic transfers execution control to said recovery sequence through one of a branch instruction and a program trap.

27. The method of claim 21, wherein said at least one out-of-order load instruction is generated during the execution of said program and is marked by a predetermined field attached to said instruction, and wherein said controlling step generates a program exception that:

a) cancels effects of said out-of-order load instruction, b) cancels effects of other instructions executed out-of-order after said out-of-order load instruction, and c) resumes execution from said original position of said out-of-order load instruction.

* * * * *